US009421732B2

(12) United States Patent
Anderson et al.

(10) Patent No.: US 9,421,732 B2
(45) Date of Patent: Aug. 23, 2016

(54) FUNCTIONALLY COATED NON-OXIDIZED PARTICLES AND METHODS FOR MAKING THE SAME

(75) Inventors: Scott L. Anderson, Salt Lake City, UT (US); Brian R. Van Devener, Salt Lake City, UT (US); Jesus Paulo L. Perez, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 650 days.

(21) Appl. No.: 13/465,496

(22) Filed: May 7, 2012

(65) Prior Publication Data

US 2013/0118064 A1    May 16, 2013

Related U.S. Application Data

(63) Continuation-in-part of application No. 13/278,886, filed on Oct. 21, 2011, which is a continuation of application No. PCT/US2010/032288, filed on Apr. 23, 2010.

(60) Provisional application No. 61/557,777, filed on Nov. 9, 2011, provisional application No. 61/172,141, filed on Apr. 23, 2009.

(51) Int. Cl.
*B32B 15/16* (2006.01)
*B32B 27/14* (2006.01)
(Continued)

(52) U.S. Cl.
CPC ............... *B32B 5/16* (2013.01); *B22F 1/0018* (2013.01); *B22F 1/0062* (2013.01); *B22F 9/04* (2013.01);
(Continued)

(58) Field of Classification Search
CPC .......... B82Y 30/00; B82Y 40/00; B22F 1/02; B22F 1/0018; B22F 3/16; B22F 9/082; B22F 9/24; C01G 23/002; C08K 9/04; C08K 9/10
USPC ............ 148/6.27; 428/402–402.24, 403, 404, 428/407; 427/212, 220, 389.9, 427/213.3–213.36, 483, 256; 264/534, 41, 264/4–4.7; 424/179.1, 641, 400, 408, 450, 424/451, 455, 93.7, 184.1, 497, 489, 501, 424/490, 491, 492, 493, 494, 495
See application file for complete search history.

(56) References Cited

U.S. PATENT DOCUMENTS 3,890,166 A * 6/1975 Kondis ............................ 148/248
3,964,939 A * 6/1976 Chandross et al. ............ 148/105
(Continued)

FOREIGN PATENT DOCUMENTS

JP    2007/223030    9/2007
WO   WO 2006/025627    3/2006
(Continued)

OTHER PUBLICATIONS

Bunker et al.; Low-temperature stability and high-temperature reactivity of iron-based core shell nanoparticles; Journal of the American Chemical Society; Aug. 2004; pp. 10852-10853; vol. 126; ACS Publishing.
(Continued)

*Primary Examiner* — James J Seidleck
*Assistant Examiner* — S. Camilla Pourbohloul
(74) *Attorney, Agent, or Firm* — Thorpe North & Western, LLP

(57) ABSTRACT

Air-stable coated particles, which include an oxidizable core having a coating substantially encompassing the oxidizable core, where the coating comprises a first organic ligand and/or a second organic ligand, are disclosed and described. The coated particles can also be substantially free of an oxide layer, especially oxide layers around the oxidizable core. As such, the coating of organic ligand(s) acts as a protective or passivating coating. The air-stable coated particles can be formed via a particle size-reduction process. An oxidizable particulate can be crushed and contacted with a first organic ligand and subsequently with a second organic ligand. The process conditions are maintained such that an oxide layer is preempted from forming on the oxidizable core. Such materials can be effective as high energy density additives for various fuels, pyrotechnic, ionic liquids, and rocket propellant applications and for biomedical applications.

14 Claims, 7 Drawing Sheets

(51) Int. Cl.
    *C10L 10/00*     (2006.01)
    *B32B 5/16*     (2006.01)
    *B82Y 30/00*     (2011.01)
    *B22F 1/00*     (2006.01)
    *B22F 9/04*     (2006.01)
    *C10L 9/10*     (2006.01)

(52) U.S. Cl.
    CPC . *B82Y 30/00* (2013.01); *C10L 9/10* (2013.01); *C10L 10/00* (2013.01); *Y10S 977/773* (2013.01); *Y10T 428/2989* (2015.01)

(56) References Cited

U.S. PATENT DOCUMENTS

| | | | |
|---|---|---|---|
| 4,877,649 | A | 10/1989 | Trowbridge et al. |
| 7,635,461 | B2 | 12/2009 | Anderson |
| 7,850,870 | B2 | 12/2010 | Ahn et al. |
| 2006/0135359 | A1 | 6/2006 | Adzic et al. |
| 2007/0056212 | A1 | 3/2007 | Fink |
| 2008/0089836 | A1 | 4/2008 | Hainfeld |
| 2010/0261029 | A1* | 10/2010 | Borysenko et al. .......... 428/562 |

FOREIGN PATENT DOCUMENTS

| | | |
|---|---|---|
| WO | WO 2007/095058 | 8/2007 |
| WO | WO 2007/120756 | 10/2007 |

OTHER PUBLICATIONS

Dias et al.; Solubility of oxygen in n-hexane and in n-perfluorohexane. Experimental determination and prediction by molecular simulation; Physical Chemistry Chemical Physics.; Jan. 2003; pp. 543-549; vol. 5, Issue 3; Royal Society of Chemistry.

Dukek; Aircraft Fuels; in BISIO (ed.) Encyclopedia of Energy Technology and the Environment; Apr. 1995; pp. 247-260; vol. 1; John Wiley and Sons, Inc., New York.

Eberhardt; Fuels of the Future for Cars and Trucks; Presentation in 2002 Diesel Engine Emissions Reduction (DEER) Workshop; Aug. 2002; 25 pages; 2002 Diesel Engine Emissions Reduction (DEER) Workshop; Aug. 25-29, 2002; San Diego, California.

Guinn et al.; Quantitative chemical topography of polycrystalline Si anisotopically etched in Cl2/O2 high density plasmas; Journal of Vacuum Science & Technology, B: Microelectronics and Nanometer Structures; Mar. 1995; pp. 214-226; vol. 13, Issue 2; IEEE.

Gunter et al.; Thickness determination of uniform overlayers on rough substrates by angle-dependent XPS; Applied Surface Science; May 1995; pp. 69-76; vol. 89, Issue 1; Elsevier BV.

Hanna et al.; A study of oleic acid and 2,4-DHB acid aerosols using an IR-VUV-ITMS: insights into the strengths and weaknesses of the technique; Physical Chemistry Chemical Physics; Sep. 2009; pp. 7963-7975; vol. 11; Royal Society of Chemistry.

Kappen et al.; Overlayer thickness determination by angular dependent x-ray photoelectron spectroscopy (ADXPS) of rough surfaces with a spherical topography; Surface Science; pp. 40-50; vol. 465, No. 1-2; Elsevier BV.

Kiss et al.; Segregation of boron and its reaction with oxygen on RH; Applied Surface Science; Jan. 1989; pp. 95-110; vol. 37, Issue 1; Elsevier BV.

Kuo et al.; Potential usage of energetic nano-sized powders for combustion and rocket propulsion (abstract); Materials Research Society Symposium Proceedings; Dec. 2003; pp. 3-14 (abstract 2 pages); vol. 800; Materials Research Society.

Martin-Concepcion et al.; Surface roughness and island formation effects in ARXPS quantification; Surface and Interface Analysis; Aug. 2004; pp. 788-792; vol. 36, No. 8; John Wiley & Sons, Ltd.

Moulder et al.; Handbook of X-Ray Photoelectron Spectroscopy; Oct. 1992; 261 pages; Perkin-Elmer Corporation, Eden Prairie, Minnesota.

Petersen et al.; Boron nanoparticles inhibit tumor growth by boron neutron capture therapy in the murine B16-OVA model; Anticancer Research; Mar.-Apr. 2008; p. 571; vol. 28; The International Institute of Anticancer Research.

Pickering et al.; Room temperature synthesis of surface-functionalised boron nanoparticles; Chemical Communications; Feb. 2007; pp. 580-582; Issue 6; Royal Society of Chemistry.

Powell; Elemental binding energies for X-ray photoelectron spectroscopy; Applied Surface Science; Jun. 1995; pp. 141-149; vol. 89, Issue 2; Elsevier BV.

Risha et al; Chapter 10, Metals, energetic additives and special binders used in solid fuels for hybrid rockets; in Kuo et al. (eds.) Fundamentals of Hybrid Rocket Combustion and Propulsion; Mar. 2007; pp. 413-456; Progress in Astronautics and Aeronautics series Book 218; The American Institute of Aeronautics and Astronautics.

Risha et al.; Characterization of nano-sized particles for propulsion applications (abstract); Materials Research Society Symposium Proceedings; Dec. 2003; p. 243-254 (abstract 2 pages); vol. 800; Cambridge University Press.

Rosenman et al.; HLA Class II DPB1 and DRB1 polymorphisms associated with genetic susceptibility to beryllium toxicity; Occupational and Environmental Medicine; Jul. 2011; pp. 487-493; vol. 68; BMJ Publishing Group Limited.

Schaffer et al.; The influence of collision energy and strain accumulation on the kinetics of mechanical alloying; Journal of Materials Science; Jan. 1997; pp. 3157-3162; vol. 32, Issue 12; Springer International Publishing AG.

Shafi et al.; Sonochemical Synthesis of Functionalized Amorphous Iron Oxide Nanoparticles; Langmuir; Jul. 2001; pp. 5093-5097; vol. 17; American Chemical Society.

Sheng et al.; A quantitative XPS study of spherically shaped powders coated with an overlayer; Surface Science; Aug. 1994; pp. 325-350; vol. 314, Issue 3; Elsevier BV.

Slutsky et al.; Synthesis of Small-Scale Boron-Rich Nano-Size Particles; Propellants, Explosives, Pyrotechnics; Sep. 2005; pp. 303-309; vol. 30 No. 4; John Wiley & Sons.

Suryanarayana; Mechanical alloying and milling; Progress in Materials Science; Jan. 2001; pp. 1-184; vol. 46, Issues 1-2; Elsevier B.V.

Thompson et al.; X-Ray Data Booklet; Jan. 2001; 457 pages; Lawrence Berkeley National Laboratory, University of California, Berkeley, California.

Van Devener et al.; Air-stable, Unoxidized, Hydrocarbon-dispersible boron nanoparticles; Journal of Materials Research; Nov. 2009; vol. 24, Issue 11; pp. 3462-3464; Cambridge Univeristy Press.

Wu et al.; Combustion Efficiency and pyrochemical properties of micron-sized metal particles as the components of modified double-based propellant; Acta Astronautica; Apr.-May 2011; pp. 1098-1112; vol. 68; Issues 7-8; Elsevier BV.

Xu et al.; Crystalline Boron Nanoribbons: Synthesis and Characterization; Nano Letters; Apr. 2004; pp. 963-968; vol. 4, No. 5; American Chemical Society.

Yinghuai et al.; Boron-based nanostructures: precursors to modern materials; Polymer Preprints; 2008; pp. 857-858; vol. 49, No. 2; American Chemical Society, Division of Polymer Chemistry.

PCT Application PCT/US2010/032288; filing date Apr. 23, 2010; University of Utah Research Foundation et al.; International Search Report mailed Jan. 17, 2011.

Chiu et at.; "Bond Analysis of Coated Boron Power"; Processing Technology and Chemical Kinetics of Boron Particles and Boron-Based Solid Fuels; Mar. 4-6, 1991.

Shyu et al.; "Combustion Characteristics of GAP-Coated Boron Particles and the Fuel-Rich Solid Propellant"; Combustion and Flame 100: 634-644 (1995).

Young, et al.; "Preparation and Properties of $Mg(B_{1-x}C_x)_2$ Using Carbon Chemical Vapor Coated Boron"; IEEE Transaction on Applied on Applied Superconductivity, vol. 17, No. 2, Jun. 2007.

Kim, Y G.; Dowben, P. A.; Spencer, J. T.; Ramseyer; Chemical vapor deposition of boron and boron nitride from decaborane (14); G. O. J. Vac. Sci. Technol. A 7 1989, 4, 2796

(56) References Cited

OTHER PUBLICATIONS

Fernando, K. A. S.; Smith, M. J.; Harruff, B. A.; Lewis, W. K.; Guliants, E. A.; Bunker; "Sonochemically Assisted Thermal Decomposition of Alane N, N-Dimethylethylamine with Titanium (IV) Isopropoxide in the Presence of Oleic Acid to Yeild Air-Stable and Size Selective Aluminum core—Shell Nanoparticles"; C. E. *J. Phys. Chem. C* 2009, 113, 500.

Brian Van Devener, P. P., Joseph Jankovich, Scott Anderson; "Oxide-Free, Catalyst-Coated, Fuel-Soluble, Air-Stable Boron Nanopowder ad COmbined Combustion Catalyst and High Energy Density Fuel"; *Energy Fuels* 2009 2009, 23, 6111.

Kim, K.; "High energy pulsed plasma arc synthesis and materials characteristics of nanosized aluminum powder"; *Metals and Materials International* 2008, 14, 707.

\* cited by examiner

FUNCTIONALLY COATED NON-OXIDIZED PARTICLES AND METHODS FOR MAKING THE SAME

RELATED APPLICATION

This application claims the benefit of U.S. Provisional Application No. 61/557,777, filed Nov. 9, 2011, and this application is a continuation-in-part of U.S. application Ser. No. 13/278,886, filed Oct. 21, 2011, which is a continuation of International Application No. PCT/US10/32288, filed on Apr. 23, 2010 which claims the benefit of U.S. Provisional Application No. 61/172,141, filed Apr. 23, 2009, all of which are incorporated herein by reference.

GOVERNMENT INTEREST

This invention was made with government support under N00173072C005 and N000140810345 awarded by Office of Naval Research. The United States government has certain rights to this invention.

BACKGROUND

Boron has a volumetric heat of combustion (i.e., energy density) more than three times that of the best practical hydrocarbon fuels, and is one of the few materials where both volumetric and gravimetric energy densities are well above those for hydrocarbons. For this reason, there has been research for decades aimed at using boron or boron-rich materials as a fuel or fuel additive in liquid or solid-fueled propulsion systems. Boron's potential as a fuel has not, to date, been realized, partly due to the difficulty in igniting and burning it efficiently. One problem is that boron is quite refractory ($T_{vap}$=2800K), thus combustion depends on heterogeneous reactions, which tend to be slow and diffusion limited. This limitation can be mitigated, at least in principle, by using nanoparticulate boron, leading to large surface-area-to-volume ratios, as suggested by a number of previous researchers. A limitation to this approach is that boron exposed to air forms a passivating native oxide layer that inhibits oxidation. Furthermore, as the particle size decreases, this oxide makes up an increasing fraction of the particle mass, and thus reduces the energy density.

There have been a number of previous reports of boron nanoparticle production using methods such as gas phase pyrolysis of diborane or solution-based synthesis routes that involve several steps. There also have been several approaches reported to coating boron particles with passivating overlayers, aimed at preventing air-oxidation, and thus enhancing ignition and combustion. Glycidyl azide polymer (GAP) has been used to coat boron particles. However it was shown in these studies that the GAP coating interacts with the boron through its native surface oxide layer; the boron particles used were already oxidized. Slurry fuels have been produced containing liquid hydrocarbon based fuels, boron and a fluoropolymer. In some cases they also included polyolefin amide alkeneamine surfactant in the slurry. In each case, the surfaces have an oxide layer that interacts with the surfactants.

SUMMARY

In light of the problems and deficiencies noted above, air-stable coated particles which include an oxidizable core having a coating comprising organic ligand(s) substantially encompassing the oxidizable core are disclosed. The coated particles can also be substantially free of an oxide layer, especially oxide layers around the oxidizable core. As such, the coating of organic ligand(s) acts as a protective or passivating coating.

In one embodiment, a method of forming air-stable coated particles can comprise crushing an oxidizable particulate, contacting the crushed oxidizable particulate with a first organic ligand to form an intermediate particulate, and contacting the intermediate particulate with a second organic ligand such that the intermediate particulate is comminuted sufficient to form a particulate oxidizable core which is substantially coated by the second organic ligand and/or the first organic ligand to form the air-stable coated particles. Further, the second organic ligand and/or first organic ligand can substantially preempt formation of an oxide layer on the oxidizable core.

In one embodiment, the second organic ligands can displace at least a portion of the first organic ligands. In one aspect, the second organic ligands can substantially displace the first organic ligands.

In one embodiment, the step of crushing can be accomplished by ball milling, planar milling, roll milling, ultrasonic milling, or combinations thereof. In one aspect, the step of crushing can be accomplished by homogenous ball milling. In another aspect, the step of crushing can be a wet milling process including a wetting agent in which the first organic ligand and/or second organic ligand is substantially soluble. In still another aspect, the step of crushing can occur in the presence of the first organic ligand. In yet another aspect, the wetting agent can be hexane or jet fuel.

In one embodiment, the step of crushing can be sufficient to form coated particles having an average diameter from about 30 nm to about 100 nm. In one aspect, the oxidizable particulate can have an average starting diameter from about 500 nm to about 1.5 μm. In another aspect, the oxidizable particulate can consist essentially of boron, aluminum, magnesium, boron carbide, boron nitride or aluminum carbide.

In one embodiment, the first organic ligand can be weakly binding. In another embodiment, the second organic ligand can be strongly binding. In one aspect, the first organic ligand and/or second organic ligand can be non-polar. In another aspect, the first organic ligand and/or the second organic ligand can be polar. In still another aspect, the first organic ligand and/or second organic ligand can be covalently attached to the oxidizable core.

In one embodiment, the method can further comprise including dry milling a particulate combustion catalyst with the oxidizable particulate under a non-oxidizing environment prior to crushing such that a composite particle is formed having at least one combustion catalyst island on the oxidizable core. In one aspect, the method can further comprise purifying the particles after the step of crushing.

In one embodiment, an enhanced fuel can comprise a fuel having the air-stable coated particles, as disclosed herein, dispersed therein. In one aspect, the fuel can be jet fuel. In another aspect, the fuel can be a solid propellant.

In one embodiment, an air-stable coated particle can comprise an oxidizable core, the oxidizable core comprising at least one of boron, aluminum, magnesium, silicon, titanium, germanium, and compounds thereof; and a coating substantially encompassing the oxidizable core; the coating comprising a first organic ligand and/or a second organic ligand. Further, the coated particle can be substantially free of an oxide layer.

In one aspect, the oxidizable core can consist essentially of boron. In another aspect, the oxidizable core can comprise a boron rich compound. In still another aspect, the oxidizable core can consist essentially of boron carbide or boron nitride. In yet another aspect, the oxidizable core can comprise an aluminum rich compound.

The first ligands and second ligands can be those as previously described. Additionally, in one embodiment, the first organic ligand and/or second organic ligand can be independently selected from the group consisting of oleic acid, stearic acid, maleic acid, sodium dodecyl sulfate, tri-octyl phosphate, organic amines, organic nitriles, organic isonitriles, and combinations thereof. In one aspect, the first organic ligand can be benzylamine. In another aspect, the second organic ligand can be oleic acid. In still another aspect, the first organic ligand and/or second organic ligand can be a fluorinated ligand. In yet another aspect, the first organic ligand and/or the second organic ligand can be independently selected from the group consisting of amines, alcohols, nitriles, amides, sulfonates, ionic liquids, and combinations or polymers thereof.

In one embodiment, the coating can be formed from the first organic ligand, the second organic ligands, or a mixture thereof. In one aspect, the coating can be substantially formed from the second organic ligand.

In one embodiment, the coated particles can be soluble in binders of rocket propellants. In one aspect, the coated particles can further comprise at least one combustion catalyst island on the oxidizable core between the first organic ligand and/or the second organic ligand and the oxidizable core. In another aspect, the combustion catalyst can be selected from the group consisting of cerium oxide, palladium oxide, tin oxide, manganese oxide, yttrium oxide, iron oxide, cobalt oxide, palladium, platinum, nickel, and composites, intermetallics, alloys thereof, and combinations thereof. In still another aspect, the coated particle can be a nanoparticle.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The present invention will become more fully apparent from the following description and appended claims, taken in conjunction with the accompanying drawings. It is to be understood that these drawings merely depict exemplary embodiments of the present invention and they are, therefore, not to be considered limiting of its scope. It will be readily appreciated that the components of the present invention, as generally described and illustrated in the figures herein, could be arranged, sized, and designed in a wide variety of different configurations. Nonetheless, the invention will be described and explained with additional specificity and detail through the use of the accompanying drawings in which:

DETAILED DESCRIPTION

Figure 1:
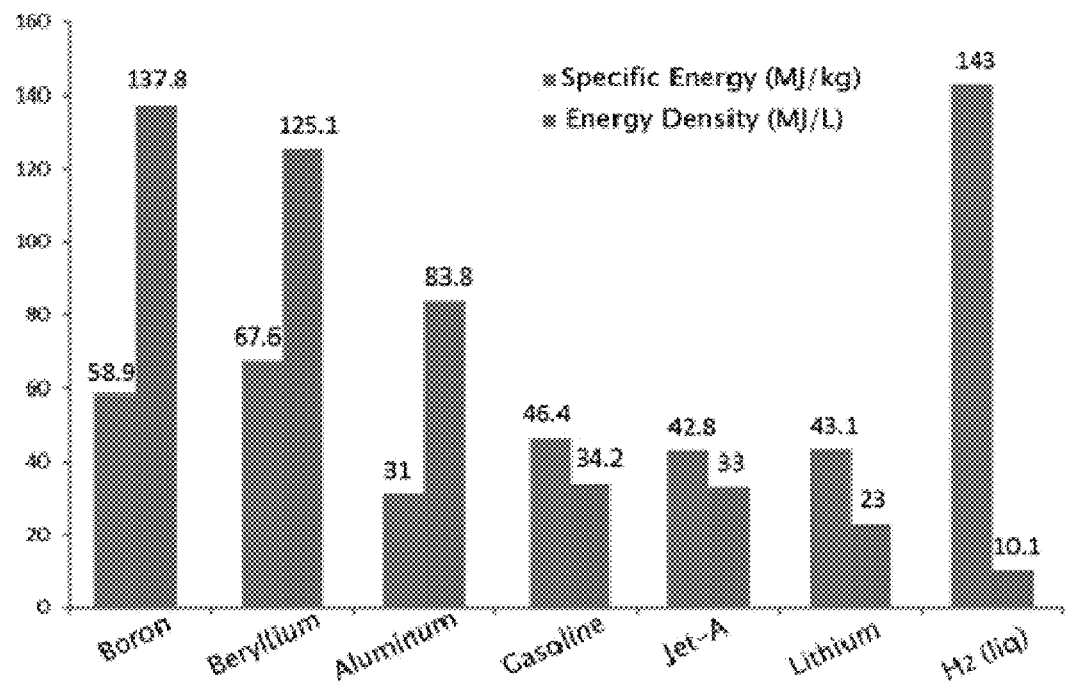
FIG. 1 is a bar graph of the specific energy (first bar) and energy density (second bar) for a variety of solid and liquid propulsion fuels as known in the art.

The following detailed description of exemplary embodiments makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes may be made without departing from the spirit and scope of the present invention. Thus, the following more detailed description is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention.

DEFINITIONS

In describing and claiming the present invention, the following terminology will be used.

The singular forms "a," "an," and "the" include plural referents unless the context clearly dictates otherwise. Thus, for example, reference to "a nanoparticle" includes reference to one or more of such materials and reference to "crushing" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "air-stable" refers to a material which is not quickly oxidized upon exposure to air or oxygen. Although some air-stable materials are stable indefinitely, most will have an extended stability of several hours to weeks. The core materials in the particles tend to oxidize within several seconds to several minutes of exposure to air, sometimes explosively, depending on the particle size, if not protected by a passivating layer. In contrast, an air-stable material is one which does not immediately oxidize but has an extended air stability.

As used herein, "encompass" refers to surrounding a particle although a continuous layer is not required. In many cases the coating of organic ligands(s) will be substantially continuous; however, this is not required as long as oxidizing species are blocked from contacting the oxidizable core.

As used herein, "nanoparticle" refers to a particle having a size less than 1 μm and generally less than about 500 nm.

As used herein, "rich" is a modifier used in associated with an element such as, but not limited to, boron or aluminum, to indicate such an element is the dominant component. For example, a material which is boron rich has a dominant portion of boron, e.g. greater than 50 atom %.

As used herein, "soluble" and "solution" refer to either a true solution of one molecule in a solvent of a different molecule, or to a stable suspension or dispersion of particles in a solvent or other media. An example of the first scenario is a solution of oleic acid in hexanes. This use of "soluble" and "solution" follows the conventional definition of a homogeneous mixture of one material with another. An example of the second scenario is a solution of nanometer boron particles in hexanes. This use of "soluble" and "solution" follow common use in the colloidal nanoparticle field, where the meaning is more akin to forming a stable suspension or dispersion of particles of one material in a solvent.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Air-Stable Coated Particles

Air-stable coated particles which include an oxidizable core having coating of a first organic ligand and/or a second organic ligand substantially encompassing the oxidizable core are disclosed. The oxidizable core can comprise an oxidizable material. The coated particles can also be substantially free of an oxide layer, especially oxide layers around the oxidizable core. As such, the coating of organic ligand(s) acts as a protective or passivating coating.

The oxidizable core can be formed of almost any oxidizable material. Non-limiting examples of such materials can include boron, aluminum, magnesium, silicon, titanium, germanium, bismuth, compounds thereof, mixtures thereof, and the like. However, of particular interest are high energy density materials such as boron, aluminum, magnesium, and compounds thereof, such as boron carbide, or materials (e.g. aluminum, magnesium, bismuth or other metals) that might be added to modify combustion or optical emission properties. In one specific aspect, the oxidizable core consists essentially of boron. In another aspect, the oxidizable core can comprise a boron rich compound such as boron carbide or boron nitride. In one specific aspect, the oxidizable core can comprise an aluminum rich compound such as aluminum carbide.

Although the core can be almost any size, for combustion particle diameters less than about 5 micrometer such as from about 10 nm to about 500 nm can be suitable. In some aspects, the core can be micron sized, e.g. about 1 μm to about 5 μm, although in other aspects the particles can be nanoparticles. Diameters from about 10 nm to about 200 nm can be particularly useful when the coated nanoparticles are used as additives to jet fuels or in solid propellants.

The coating of organic ligand(s) can be formed of a wide variety of compounds which can be attached to the oxidizable core (and optionally catalyst material bonded thereto). Although not always required, the first and/or second organic ligand can typically be covalently attached to the oxidizable core. Generally, the first organic ligand is a weakly binding ligand and the second organic ligand is a strongly binding ligand. A weakly binding ligand is one that is sufficient to protect the oxidiazable core surface but is also displaceable by a corresponding strongly binding ligand. Weakly binding can be a functional group which binds to the surface of a particle and mediates, but not inhibits the binding of a moiety that can bind to the surface with a strong covalent or ionic bond. Weakly binding can be binding where ligands share a weak interaction such as a van der Waals, dipole-dipole, or hydrogen bonding interactions. For example, a carboxylic acid group with aluminum. As a general guideline, weakly binding ligands can include molecules containing amine functional groups, nitrile functional, ester groups, ether groups, sulfonyl groups, or fluorocarbons. Strongly binding ligands can include a functional group that cannot be easily removed from the surface by simple agitation (i.e. sonication) or solvent washing. As such, strongly binding can include covalent, ionic, dative, or metallic bonding interactions. In such cases, the ligands can be removed from the surface via chemical means, such as either by reaction or sufficient heating.

In one aspect, the first and/or second organic ligand(s) can be non-polar. Further, it is often desirable for the organic ligand(s) to provide for solubility in a particular fuel composition, whether a liquid or solid fuel. For example, the first and/or second organic ligand(s) can have a hydrophobic moiety on a free end such that the coated particles are soluble in hydrocarbon solvents and/or fuels. Although other organic ligands can be suitable, non-limiting examples can include oleic acid, stearic acid, maleic acid, linoleic acid, behenic acid, sodium dodecyl sulfate, alkyl amines, tri-octyl phosphate, and combinations thereof. In one aspect, the first organic ligand can be benzylamine and the second organic ligand can be oleic acid. In another aspect, the organic ligand(s) can be a fluorocarbon ligand. Fluorocarbon compounds can be desirable in order to reduce or eliminate formation of hydrogen-boron compounds such as HOBO during combustion so as to strongly favor formation of $B_2O_3$ and boron fluoride compounds which result in a higher combustion energy. Thus, in one specific aspect, the second organic ligand can be perfluorotetradecanoic acid or perfluorooleic acid. The use of perfluoro or highly fluorinated compounds can be particularly suitable for use with solid propellants. Alternatively, the organic ligand(s) can be polar. Such polar ligands can provide for solubility in polar materials such as, but not limited to, water, ionic liquids, polymers and/or polar solvents. Non-limiting examples of suitable polar ligands can include organic amines, alcohols, nitriles, amides, sulfonates, ionic liquids and combinations or polymers thereof. In one aspect, the coated particles can be dispersible in rocket propellants. As such, solubility in propellant binders (e.g. PE, GAP, PU, PPG, etc) can often be desirable.

In some aspects, it can be desirable to include a catalyst material with the oxidizable material. Such catalyst material can be provided as a distinct particulate material dispersed within a fuel. However, in some cases it can also be beneficial to incorporate the catalyst material into the coated particle. Thus, in one specific aspect, the particle can include at least one combustion catalyst island on the oxidizable core between the organic ligand(s) and the oxidizable core. Typically, during formation the catalyst material can attach or deposit onto the outer surface of the oxidizable core in discrete islands. The coating of organic ligand(s) then encompasses and surrounds both the core and the attached catalyst islands. Non-limiting examples of suitable combustion catalyst include cerium oxide, palladium oxide, tin oxide, manganese oxide, yttrium oxide, iron oxide, cobalt oxide, palladium, platinum, nickel, other metals or rare earths, and composites, intermetallics, alloys thereof, and combinations thereof. In one aspect, the combustion catalyst is cerium oxide. Other surface chemistry modifiers can also be used such as, but not limited to, alkali, alkaline earth metals.

The air-stable coated particles can be formed via a particle size reduction process. In particular, an oxidizable particulate can be crushed in the presence of a first organic ligand. In one embodiment, the ligand molecule has one or more functional groups that tend to react and bond with the surface of the particle material. The crushing process can be performed in a nitrogen or other inert atmosphere to give the first organic ligand a chance to bond to, and coat the surfaces before they are exposed to air or other oxidizing environment forming an intermediate particle. The intermediate particles can then be exposed to a second organic ligand that can partially or substantially displace the first organic ligand. The second organic ligand may also bond to the core in spaces not occupied by the first organic ligand. Depending upon the types of ligands used, the combination of a first and second organic ligands may provide a better packing density than the use of a single ligand.

Additionally, the present coatings may involve dative covalent bonding where both electrons forming the bond comes from a single atom in the ligand, e.g nitrogen. When the ligand coated particles are subsequently exposed to air, they do not oxidize. The oxidizable particulate is comminuted sufficient to form particulate oxidizable core which is substantially coated by the organic ligand to form the air-stable coated particles. The process conditions are maintained such that the organic ligand(s) substantially preempts formation of an oxide layer on the oxidizable core. The presence of the organic ligand(s) and an optional wetting agent can prevent oxygen contact with newly fractured particles. Thus, as the crushing occurs, fresh non-oxidized surfaces can be exposed and immediately contacted with the first organic ligand and/or wetting agent rather than undesired oxygen or oxygen-containing compounds. As a result, substantially the only oxide in the particles are the native oxide from surfaces of the original uncrushed particle which typically makes up a small fraction of the core surfaces (e.g. typically less than about 5%, and in some cases less than about 0.1%, depending on the degree of crushing involved). For example, a 10 μm starting particle with a native oxide layer crushed to 100 nm results in a diameter reduction factor of 100, and a surface area reduction of 10,000. Some small degree of native oxide is typically present and often unavoidable. However, the amount of such native oxide is substantially smaller than that which would form on unprotected particles, and may be undetectable by XPS.

The crushing can be accomplished using any method which reduces the particle size while allowing for simultaneous contact with the organic ligand. Alternatively, crushing can be performed under a non-oxidizing environment (e.g. solvent or inert gas) and the crushed material subsequently placed in contact with the first organic ligand. Non-limiting examples of suitable crushing techniques include ball milling, planar milling, roll milling, ultrasonic milling, or combinations thereof. In one aspect, the step of crushing is accomplished by ball milling. Specifically, in one embodiment, the milling can be homogenous media ball milling. Milling can be done as a wet process or dry process. In one specific aspect, the step of crushing is a wet milling process which involves using a wetting agent in which the organic ligand(s) are substantially soluble. The wetting agent can have a multi-purpose of solubilizing the organic liquid(s) and acting as a carrier, as well as providing a medium to prevent agglomeration or caking of the milled particles, and provide a barrier to oxygen-containing compounds while the organic liquid is coating the crushed particles. Generally, the wetting agent can be free of oxygen or at least free of reactive oxygen which could form oxide at the core surface. Although not required it can be beneficial to chose a wetting agent which has the same composition as an intended final liquid product, e.g. jet fuel. This can eliminate the need for later cleaning or solvent removal processes. Non-limiting examples of suitable wetting agents can include organic molecules that do not have substituents that might react with the core material, such as hexane, jet fuel, dodecane, straight chain and branched alkanes and alkenes, short and long chain nitriles, aromatic molecules with no reactive substituents, acrylonitrile, amines, and the like.

Regardless of the specific crushing approach, in each case the starting material is substantially larger than the final oxidizable core size. Thus, the coated particles are formed by size reduction rather than by deposition or assembly processes. In one aspect, the oxidizable particulate has an average starting diameter from about 500 nm to about 1.5 μm. Although other ranges can be suitable, the step of crushing can in some cases be sufficient to form coated particles having an average diameter from about 30 nm to about 100 nm. At large scale production for example, an oxidized boron starting powder greater than 10 microns can be used so that the oxide coverage deriving from the native oxide coating on the starting powder would be <0.1% in the final nanopowder. However, specific starting materials can be varied and optimized for particular processing equipment and final product specifications. Typically, any native oxide layer is only a few nm thick.

As previously indicated, a combustion catalyst can be optionally integrated into the particle. This can be accomplished by including a particulate combustion catalyst during crushing. Alternatively, the combustion catalyst can be dry or wet milled with the oxidizable core material. Such milling allows the catalyst to deposit and adhere to outer surfaces of the core material to form a composite particulate. Subsequent crushing in contact with the ligand(s) allows the ligand(s) to coat around the composite particulates. In this manner, the composite particle is formed having at least one combustion catalyst island on the oxidizable core between the oxidizable core and the organic ligand(s). This same intermediate milling can be used with other surface modifiers prior to contact with the ligand material.

Depending on the purity and composition of the starting materials, milling equipment, and process conditions additional purification steps can be optionally applied to the coated particles to remove undesired elements. The desired degree of purity will, of course, depend on the intended application. For example, a high performance, high energy density jet fuel may require substantially no impurities while flare or other pyrotechnic applications can tolerate more impurities. Purifying can involve the use of magnetic cleaning to remove magnetic impurities, e.g. particles of Fe or tungsten carbide from milling media, etc. Similarly, washing and drying can be used to remove excess wetting agent, excess organic ligands, and the like. Sedimentation can also be used to allow aggregates to settle from suspended particulates and solvent and/or wetting agent. An initial milling followed by separation may be used to remove surface contaminants, including native oxide, from the surface of contaminated or oxidized starting material. In one alternative, low-quality contaminated boron or other core material can be milled in the presence of a solvent and ligand. Many contaminants are soluble in hexane or other solvents under these conditions such that the milling and contact with the ligand can often also result in removal of impurities from the starting particulate materials.

The air-stable coated particles can be incorporated into a variety of fuel or pyrotechnic materials. With the addition of the coated particles dispersed in such materials an enhanced fuel can be formed with increased energy release per weight of the fuel. Non-limiting examples of such materials can include jet fuels, flares, solid propellants, liquid rocket fuels, and the like. In one aspect, the fuel is jet fuel. In another aspect, the fuel is a solid propellant. Other applications for these air-stable coated particles can include neutron capture therapy (e.g. using $B^{10}$ tagged with a tumor binding ligand).

Example 1

Benzyl Amine and Oleic Acid Coated Aluminum

It is the high energy density combined with the rapid burn rate that makes aluminum such a useful propellant (FIG. 1). The burn characteristics of aluminum depend on particle size, dispersion, and aggregation during the burning. It is these characteristics combined with the fact that aluminum is extremely difficult to keep in its native metallic state that make nano-aluminum such a difficult project. Combining the freshly generated aluminum surfaces with a capping agent such as carboxylic acid or amine, will result in a spontaneous reaction where the capping agent binds to the surface. These capping agents not only protect the particles from oxidation, making them air stable, but also assist in dispersion and help prevent aggregation.

Figure 2:
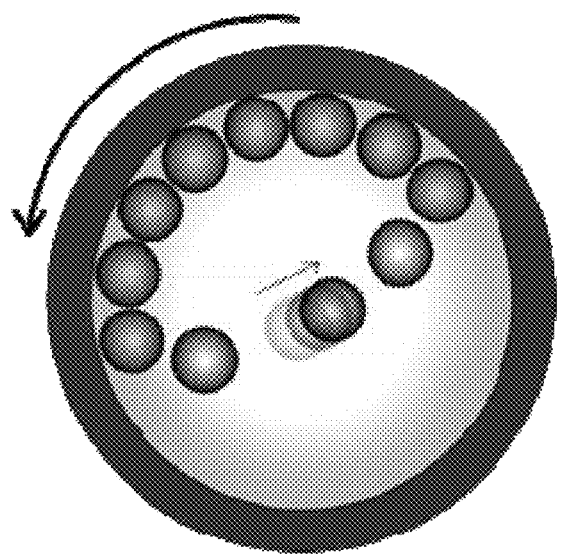
FIG. 2 is an illustration of the subject motion of the milling media in conventional ball milling on a Retsch PM-400 in accordance with an embodiment of the present invention.

Conventional planetary ball milling has been developed with the intention of using the linear force of high density balls to physically crush up brittle feedstocks into smaller particles. In this process, the jars revolve around the perimeter of a large sun wheel, at the same time each jar is rotated opposite the revolution of the jar. This counter-spinning of the jars causes the balls to leave the wall and crash against the opposite side of the jar (FIG. 2). It is the repeated impact of these balls between themselves and the walls that mill a feedstock into the nano size regime. This impact method of particle size reduction works well for hard metals such as iron or brittle materials like boron, but this process is less likely to be effective for soft, ductile feedstock materials. When soft metal nanoparticles are subjected to this milling process the energy generated by the milling media is high enough to permanently fuse small nanoparticles into relatively large aggregates. This process has come to be known as "cold welding".

Materials.

Aluminum 1100-H16 Ball, 5/16" diameter obtained from Small Parts. Benzylamine (99%) and oleic acid (90%) were all obtained from Sigma Aldrich and used as received. Acetonitrile (99.5%) and Hexanes (98.5%) were obtained from Mallinckrodt Chemicals and used as received. Argon (99.9999%) was received from DJB Gas Services.

Synthesis.

The synthesis of these aluminum nanoparticles is done using a novel high energy ball milling approach, i.e. "homogeneous media ball milling." Homogeneous media ball milling differs from conventional milling, in that the feedstock acts as its own media for the milling. This process eliminates the need for media and feedstock by generating nanoparticles directly from a uniform media. All handling of the pre-milling and post-milling product is done in a dry nitrogen filled glove box. This care is taken not only in lieu of the pyrophoric nature of the nascent nanoparticles, but this care can also be taken as to not oxidize the particles before the capping agents have the opportunity to react with the surface. This milling procedure is performed on a Retsch PM-400 using 500 ml tungsten carbide jars, and modified stainless steel lids. The lids are modified in such a manner that they have two separate check valves, so that prior to milling the jars may be evacuated and subsequently filled with Argon. The valves are then capped with a Teflon tape coated pipe thread plug to ensure that no gasses are exchanged, if the valve fails during milling. Prior to milling the jars are filled approximately ¾ full by volume with 280 g of Aluminum 1100-H16 Ball, 5/16" diameter balls. For other materials the mass will differ, but the volume occupied by the media can usually remain about ¾ full to minimize linear crashing motion. Each jar then goes through 5 vacuum-fill cycles, where the atmosphere of the jar is evacuated for 1 minute to the capacity of a Welch Duo-Seal Vacuum Pump (model 1376), and filled with 30 psi of argon.

Due to the native oxide coating on the aluminum balls, they must wash milled at least 3 times before using to produce unoxidized nanoparticles. This wash milling stage entails preparing the balls as stated, adding 100 ml of acetonitrile (ACN) to the jar along with 5 ml of benzyl amine. The jar is then pressurized again to 30 psi with argon. The jars are the placed on the planetary mill to be milled for 1 hour at a speed of 350 rpm. This process of wash milling is used to mill away the thin surface oxide that is formed on the balls as shipped. It is performed 3 times to ensure that the majority of surface oxide is removed from the balls and suspended in such a manner that they may be washed away with ACN rinsing. After the balls have gone through each 1 hour wash milling, the jars are opened up in the dry nitrogen filled glove box and rinsed with ACN. They are sonicated and shaken in a polycarbonate bottle with ACN, several times until the resultant supernatant is clear. This is done to remove as much particulate matter from the surface of the balls as can be by these methods.

The aluminum nanoparticles synthesized are to be capped via a unique two-step process. A final evacuation is performed where 100 ml of freeze-pump-thawed 5% benzylamine in ACN solution is added to the jar. The jar is then pressurized again to 30 psi with argon. The jars are then placed on the mill to be milled for 3 hours at revolutionary speed of 350 rpm. Post milling the jars are opened up where a thick black suspension that mildly coarse to the eye is observed. A 50 ml aliquot of is removed from the jar and 2 ml (excess) of oleic acid is added. The new suspension is then sonicated for approximately 1 min. Post agitation the suspension has transformed from a mildly coarse suspension to what appears like a thin used motor oil color and consistency. The suspension is then centrifuged again to remove the minor amounts of large particles that are produced during the process. The final product is air stable aluminum nanoparticles.

Characterization of Particles.

Transmission Infrared Fourier Transform Spectroscopy was performed using a Bruker TENSOR 37. The FTIR sample was drop cast on a NaCl plate and placed in the dry $N_2$ analysis chamber of the TENSOR 37. The spectra were taken in transmission mode with a clean NaCl plate as a background spectrum. X-Ray photoelectron spectroscopy was performed with an ESCALAB II model A9343 using an aluminum source. A standard Al source was used since a monochromatic source was not available at the time. Thermally driven capping agent desorption and oxygen dosing was performed on the TPD stage in the ESCALAB II. A quadrupole mass filter mass spectrometer (SRS RGA 300) was used to measure the fragments desorbed from the aluminum nanoparticles. The heating was done with an electron impact source, with the capability to heat the sample stage to 1200K. For XPS, capping agent desorption, and oxygen dosing, the sample was drop cast onto a copper shim that had been roughed using sandpaper (600 grit). The shim was then sonicated for 15 minutes in ethanol (200 proof) for cleaning The analysis procedure for this sample is to first pump the sample down to about $1 \times 10^{-8}$ torr. The sample is then placed on a TPD stage and cooled to ~290 K. The sample is then heated quickly to 530 K and held for 30 min. Mass scans are taken at the initial value of 530 K and the 1 scan per 5 minute interval. An XPS is taken once the majority of free oleic acid is desorbed. The sample is then brought back out to the TPD stage and "cooked" at 800 K to remove any residual free oleic acid as well as bound oleic acid. The sample is then dosed with 100 Langmuirs of oxygen. Another XPS spectrum is taken. The sample is then placed back on the TPD stage for a second saturating dose of $O_2$~ an additional 100 Langmuirs of $O_2$. A final XPS spectrum is taken.

SEM was performed using a FEI NanoNova Scanning Electron Microscope. TEM and EDX were taken on a FEI Titan 80-300 TEM with EDX and EELS. For both the SEM and TEM the sample was drop cast onto a carbon matrix TEM grid and examined. Dynamic light scattering was performed using a NICOMP 380 ZLS and measurements confirmed with a Wyatt Technologies DynaPro Nanostar DLS instrument.

Results and Discussion

Figure 3:
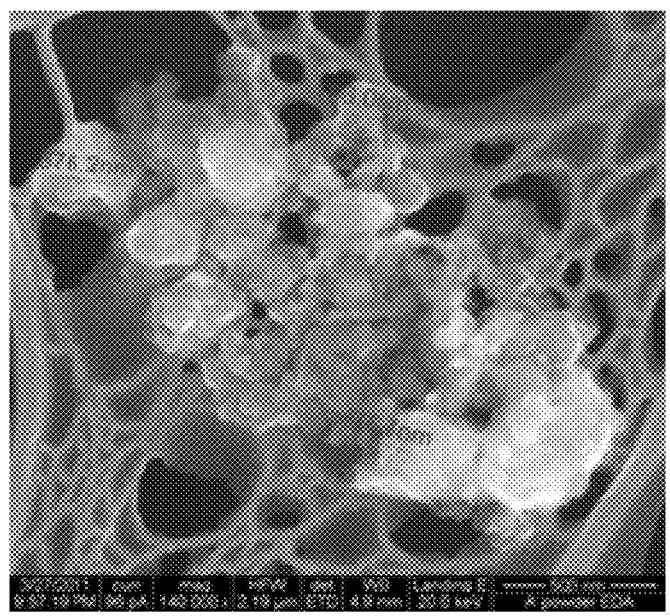
FIG. 3 is an SEM image of 20 μm alumina feedstock ball milled for 3 hours and sonicated for 30 min in accordance with an embodiment of the present invention.
Figure 4:
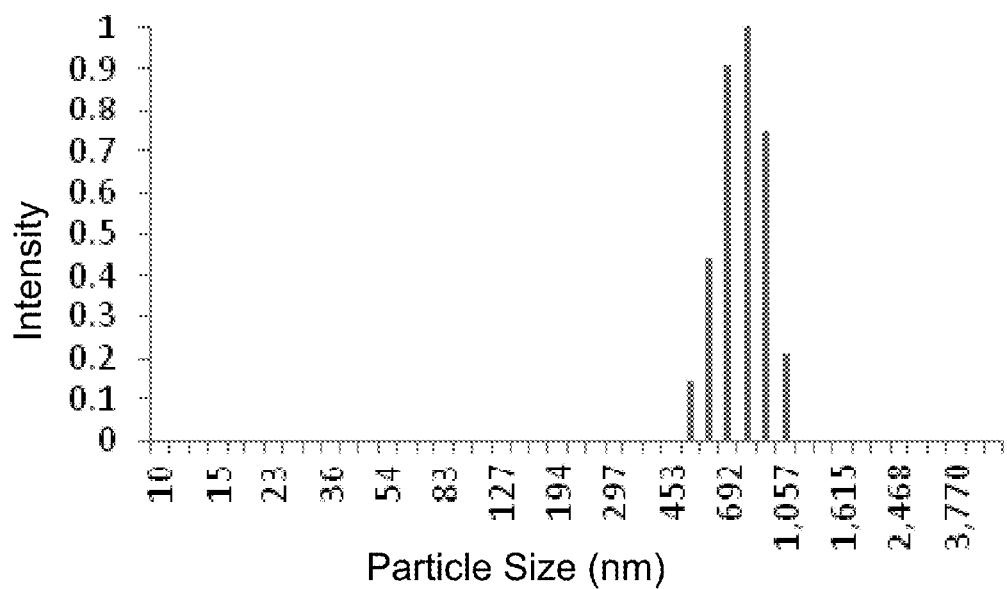
FIG. 4 is a graph of a volume weighted dynamic light scattering (DLS) particle size distribution for 20 micron aluminum powder feedstock, milled for three hours with tungsten carbide balls in accordance with an embodiment of the present invention.

Mechanical high energy ball milling consists of using a high density ball such as (tungsten carbide) to crush a powdered feedstock into nanoparticles. Consequently for materials that are malleable such as aluminum, this approach fails to produce nanoparticles less than approximately half a micron. Characterization of these particles begins with measuring the size of these particles. The particle sizes are measured using dynamic light scattering to measure the bulk of the sample in the form of a suspension, and the more direct techniques of TEM and SEM are used to analyze individual particles. Aluminum high energy ball milling was initially studied in our lab using 20 μm and 50 nm feedstocks. However, results were unsuccessful in these experiments. The 20 μm powder produced large, aggregated particles (FIG. 3). Average particles sizes were determined to be approximately 760 nm as determined by DLS (FIG. 3). This is true regardless of light or extensive milling. Before depositing the particles on a TEM grid for analysis, the particles were ultra-sonicated for 30 min to break up any loose aggregates. It is clear that even with the sonication they are highly aggregated (FIG. 4). This is evidence of "cold welding" of nanoparticles which can happen to hard and brittle materials such as iron and boron, but is more prominent in softer metals.

Figure 5:
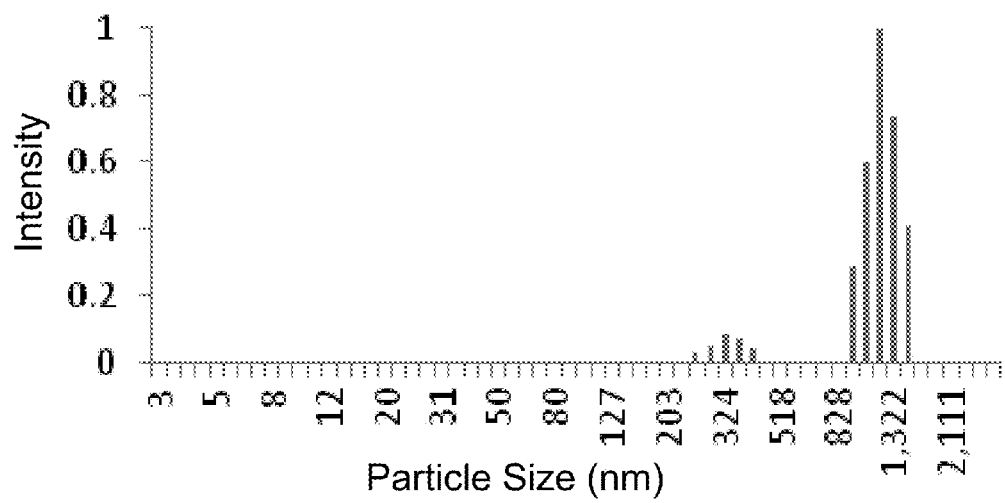
FIG. 5 is a graph of a volume weighted dynamic light scattering (DLS) particle size distribution for 50 micron aluminum powder feedstock, milled for three hours with tungsten carbide balls in accordance with an embodiment of the present invention.
Figure 6:
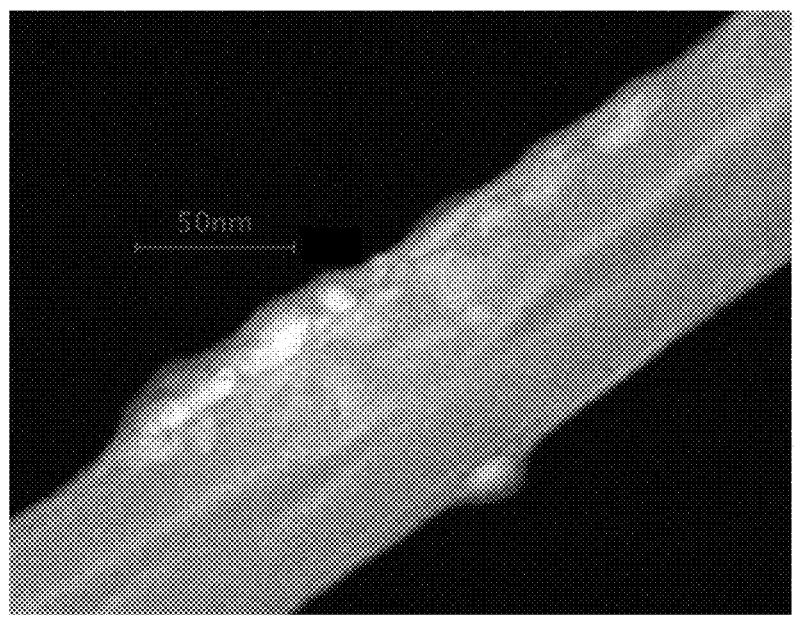
FIG. 6 is a transmission electron microscopy (TEM) image of aluminum nanoparticles synthesized via homogeneous media ball milling (HMBM) in accordance with an embodiment of the present invention.

In another milling set-up, 50 nm Al powder is used as feedstock. DLS measurements (FIG. 4) showed an average size of about 1.2 μm, which to our surprise is substantially larger than our starting material. The permanent fusion of ductile and even in some cases brittle nanoparticles can take place during mechanical milling. At this point it was suspected that cold welding was taken place during our milling process. Dynamic Light Scattering showed that over 90% of the volume of the particles was an average of ~1200 nm in diameter (FIG. 5). Much like in the preparation for SEM these particles the particles were ultra-sonicated for DLS. Although the particles could be coated with a capping agent that would resist aggregation under the conditions of a suspension, it is conceivable that capping agent cannot prevent the joining of particles under the forces generated by high energy ball milling.

Homogeneous media ball milling (HMBM) was developed to overcome this "cold welding" issue. HMBM differs from conventional planetary ball milling in that no powdered feedstock is used. The milling media used is simply the material that one desired nanoparticles. This process quite simply consists of only using aluminum balls of a relatively homogeneous size. Where traditional milling utilizes the impact of high momentum balls traveling across the jar, and then making impact with a brittle feedstock to reduce the particle size, HMBM utilizes the friction between the aluminum ball feedstock to generate nanoparticles. It is the centrifugal force of the jars on the sun wheel combined with the spinning of the jar that forces the balls past each other with enough friction to rub off nascent aluminum particles. The exact mechanism of how these particles are synthesized has yet to be determined. It is likely that it is one of two scenarios. It is conceivable that very small particles, tens of atoms to tens of thousands of atoms, are removed from the ball and coalesce into small nanoparticles. Though, it could be as simple as the forces generated in the milling process simply chip away the nanoparticles from the balls in a one-step process. Although it is likely that there still is some roll and crash motion associated with the balls, the jar is filled almost ¾ volume full to minimize the possible linear travel of the balls, and maximize the available surface area of the balls grinding past each other.

Figure 7:
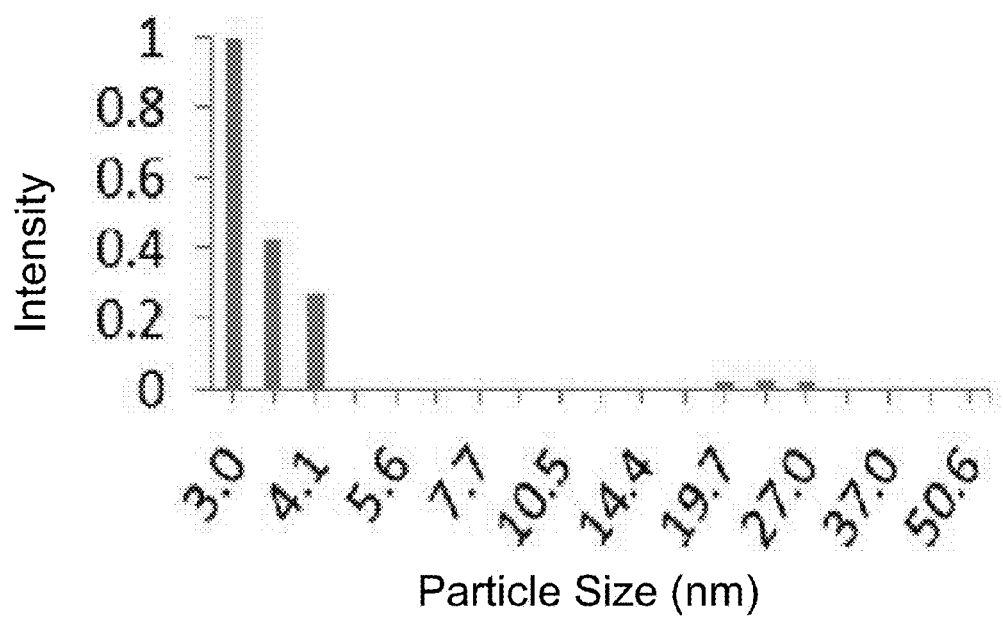
FIG. 7 is a graph of a volume weighted dynamic light scattering (DLS) particle size distribution for particles synthesized by 3 hours using homogeneous media ball milling (HMBM) (particles were in situ benzylamine treated, post milling oleic acid capped) in accordance with an embodiment of the present invention.
Figure 8:
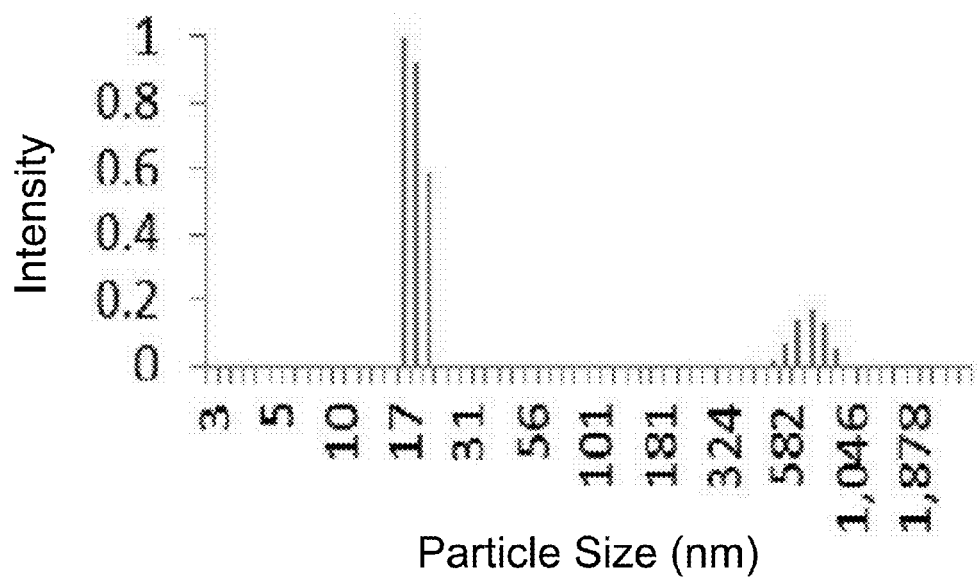
FIG. 8 is a graph of a volume weighted dynamic light scattering (DLS) particle size distribution for particles synthesized by 3 hours of homogeneous media ball milling (HMBM) in hexanes in accordance with an embodiment of the present invention.
Figure 9:
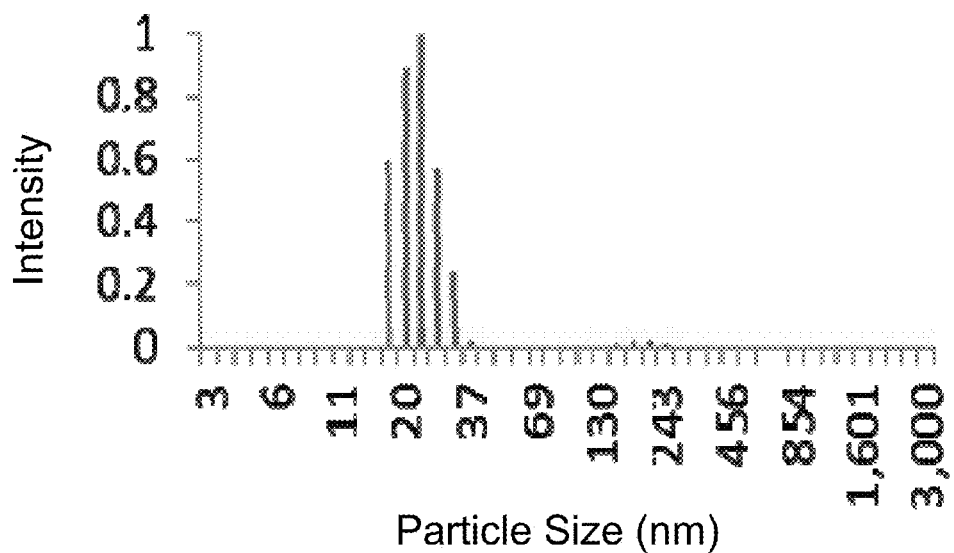
FIG. 9 is a graph of a volume weighted dynamic light scattering (DLS) particle size distribution for particles synthesized by 3 hours of homogeneous media ball milling (HMBM) in acetonitrile in accordance with an embodiment of the present invention.
Figure 10:
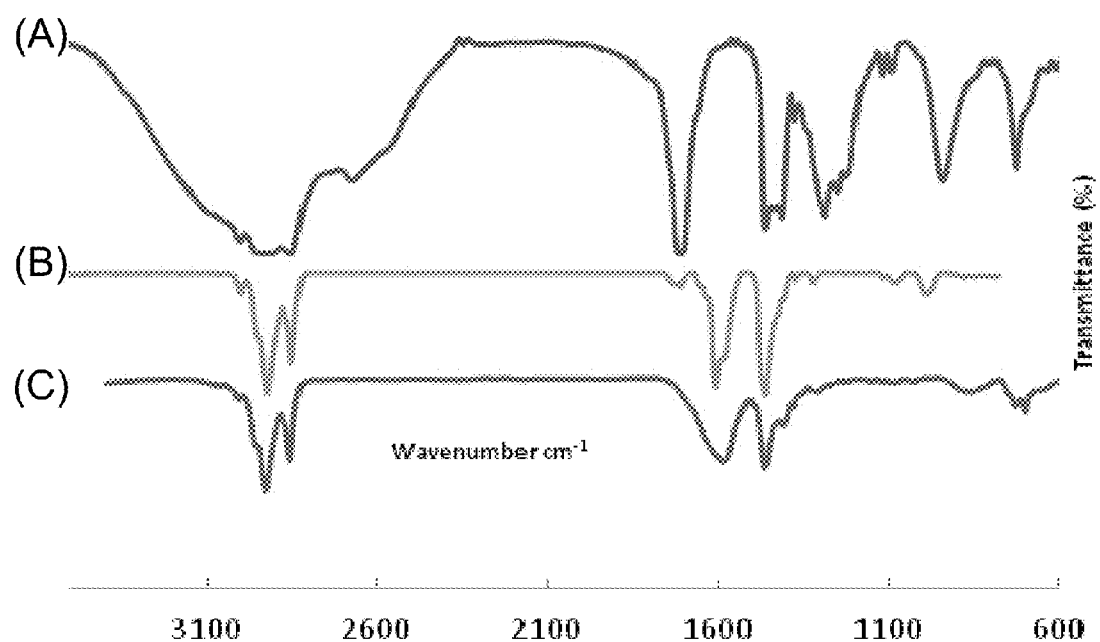
FIG. 10 is an infrared spectrometry graph of benzylamine treated, oleic acid capped aluminum nanoparticles (a) neat oleic acid, (b) in situ oleic acid milled aluminum nanoparticles, (c) in situ benzylamine treated, post milling oleic treated aluminum nanoparticles; in accordance with embodiments of the present invention.

Dynamic light scattering, shows size a size distribution ranging from 3-5 nm (FIG. 7). In an earlier study of particles that were generated using this same in situ treatment, but with oleic acid only, one can see that the particles generated are very small with only a few above 20 nm. FIG. 5 is a TEM showing a sample dropped on a Cu grid w/ a thin carbon film. Aluminum particles smaller than 10 nm are seen deposited on the film. Dynamic light scattering, shows size a size distribution ranging from 3-5 nm (FIG. 7). The synthesis of nanoparticles does not depend on using a particular size for the starting material. This same procedure has been performed using ³⁄₃₂", ⅛", and ⁵⁄₁₆" balls in each case finding similar particle size distribution. The size distribution of these particles does vary some based upon the starting material. This effect is most likely due to the mass of each ball interacting with the others. This effect of individual ball mass has not yet been studied in detail, but is a future area of study. For scope of this paper ⁵⁄₁₆" starting material was used for all homogeneous ball milling.

A wetting agent is then added to disperse the particles generated as well as provide the appropriate environment the milling of the balls. As previously mentioned aluminum is extremely reactive with any available oxygen during the milling process. Although measures have been taken to remove and replace free oxygen with argon prior to milling, it has been determined through progressive research that oxygen containing wetting agents can also react with the surface of the particle thus oxidizing the particle. Therefore the only appropriate wetting agents we have used for this process include non-polar alkanes such as hexanes, and non-oxygenated polar solvents such as acetonitrile and possibly methylene chloride.

The particle size does show some dependency on the wetting agent used. It seems that when regardless of solvent, the as milled suspension shows a bi-modal particle size distribution with the larger volume mode centered on approximately 20 nm. The hexanes distribution has a mode at 19.2 nm with 85.5% of the volume, and a mode at 733.6 nm with 14.5% of the volume.

Alternatively, when milled in ACN the distribution has a mode at 22.3 nm with 98.3% of the total volume and a mode at 197.6 nm with 1.7% of the total volume. So by varying the wetting agent one can vary the distribution of the particles for the same milling procedure.

Once the size of the particle has been characterized the next step is to analyze the surface functionality. To determine the surface composition of the particles, infrared analysis is used. FTIR spectra of the samples were taken by reflectance spectroscopy. Neat oleic acid was dropped and deposited on a stainless steel shim where an IR beam is focused and then reflected through the sample and collected on a liquid nitrogen cooled MCT detector. The nanoparticle spectra were taken from samples drop cast on a clean NaCl plate in transmission mode. Information about the vibrational modes of organic groups adsorbed on the particles surface is carried by the reflected beam. Resulting FTIR spectra of the sample wee then analyzed and compared with that of neat oleic acid (FIG. 7). Once the size of the particles has been characterized the next step is to characterize the surface functionalization of the particles. The first step in determining the surface composition of the particles is analyzing the vibrational modes via infrared analysis. The important features to be noted in the neat oleic acid (FIG. 7) sample are the C=O stretch at 1722 $cm^{-1}$ (C=O associated with dimeric oleic acid), the intense broad OH stretching feature between 3300 $cm^{-1}$ and 2300 $cm^{-1}$, the $CH_2$ asymmetric and symmetric stretches at 2931 $cm^{-1}$ and 2858 $cm^{-1}$, the OH bending present at 1450 $cm^{-1}$ and 950 $cm^{-1}$ respectively, and the C—O stretch located at 1251 $cm^{-1}$. When milling the particles with oleic acid and hexanes, one can see that we have functionalization of the particles, which is indicated by the strong presence of the $CH_2$ peaks and lack of the presence peaks indicating OH. Also peaks are observed at 1595 $cm^-$ and 1465 $cm^{-1}$ indicating the asymmetric and symmetric stretch of C—O as a carboxylate moiety.

This example involves a new two-step in situ process using benzylamine in the milling stage and then subsequently treating the product with oleic acid. FTIR spectra of the sample were produced in this manner shows a weak shoulder at 1710 $cm^{-1}$ leading to a broadened asymmetric C—O stretch of 1581 $cm^{-1}$. A shoulder of the asymmetric C—O stretch at 1581 $cm^{-1}$ is observed with only slightly less intensity. This shoulder at 1608 $cm^-$ is also representative of a C—O stretch that indicates a second type of interaction with the aluminum surface. This broadening of the C—O peak is attributed to the many bands associated with the carbons located on the aromatic ring of benzylamine. The separation of the C—O asymmetric and symmetric bands is an indication of how the carboxylate group is bound to the surface. For the benzylamine treated aluminum nanoparticles the symmetric stretch falls at 1465 $cm^{-1}$. Evidence of a carboxylate interaction between oleic acid and other metals are found in the literature. Stretches depend on the type of carboxylate interaction (monodentate, bidentate, bridging bidentate, and ionic) and may range from 110 $cm^{-1}$ to 300 $cm^{-1}$. This separation of 116 $cm^{-1}$ is characteristic of a strong interaction of both oxygens from the oleic acid forming a chelating bidentate interaction with the aluminum surface, and the separation of 139 $cm^{-1}$ is representative of a bridging bidentate interaction. In both cases, both oxygens of oleic acid play a role in binding to the nanoparticle, but in the chelating motif both oxygens bind to the same aluminum atom. In the bridging bidentate interaction both oxygens bind to the aluminum nanoparticle, but to separate aluminum atoms on the particle surface.

Figure 14:
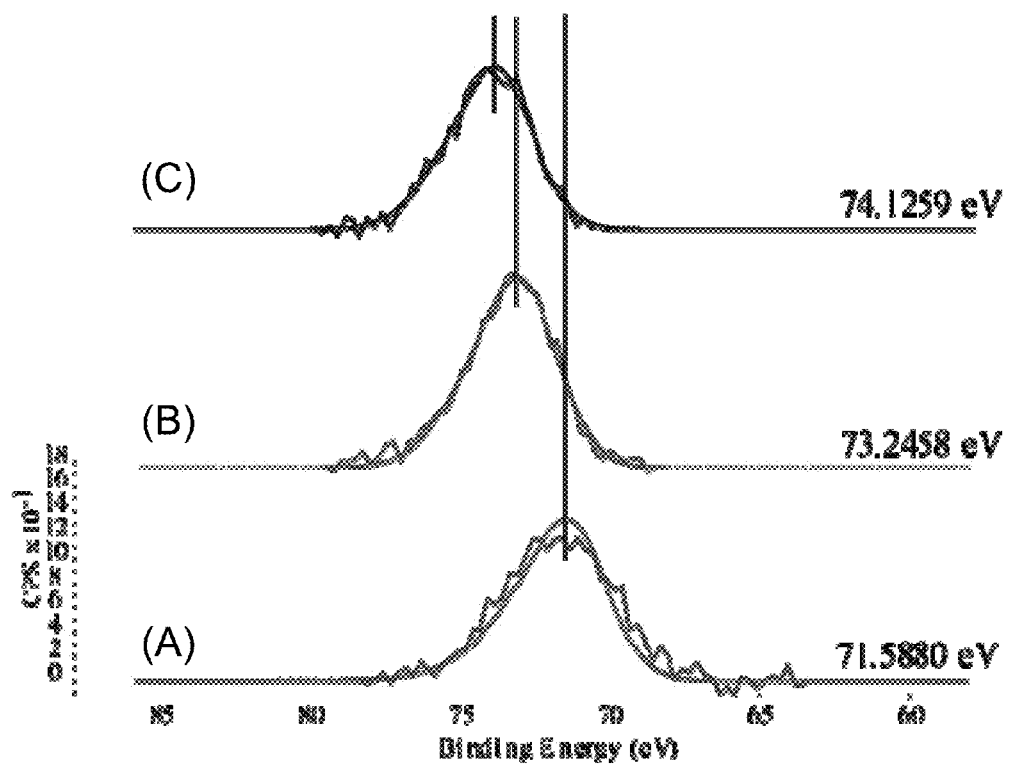
FIG. 14 is x-ray photoelectron spectroscopy (XPS) spectra (A) in situ benzylamine (BA) treated oleic acid (OA) capped after free oleic desorption (B) after bound OA cooking and 500 Langmuir dose of $O_2$ (C) sample treated post milling with BA and capped with OA in accordance with embodiments of the present invention.

One goal of this project is to generate air-stable aluminum nanoparticles that are free from surface oxidation as well as protected from oxidation when exposed to atmosphere. X-Ray photoelectron spectroscopy was performed on and ESCALAB II to confirm the oxidation state of the particles. For this analysis the binding energy shift of the aluminum 2p peak was investigated. All binding energy corrections were done using C 1s as reference (284.5 eV). The sample was anlyzed after cooking off the majority of excess oleic acid (FIG. 14A). After desorbing the bound oleic acid at 800 K, the sample was dosed with 100 Langmuirs of $O_2$ and a second XPS scan taken (FIG. 14B). Comparing Sample (A) with sample (B) which was exposed to a very minimal amount of oxygen, we see that there is a 1.66 eV shift in binding energy, confirming the oxidaton of the naked aluminum nanoparticles. The particles were drop cast from a concentrated solution onto a copper shim and allowed to dry in the air. These particles have not been washed with hexanes, therefore excess oleic acid is present in the suspension. Since so much oleic acid is initially present the excess (free) oleic acid must be cooked off. This was done using an electron impact source. The sample was heated to 530 K for 30 min. A mass spectrometry scan was taken every 5 min to monitor the signal from oleic acid fragments. Mass 67 was chosen as the key indicator of oleic acid being desorbed. This mass was chosen due to its prominent nature in the spectrum and it's relatively high mass indicating large fragments indicative of oleic acid.

Figure 11:
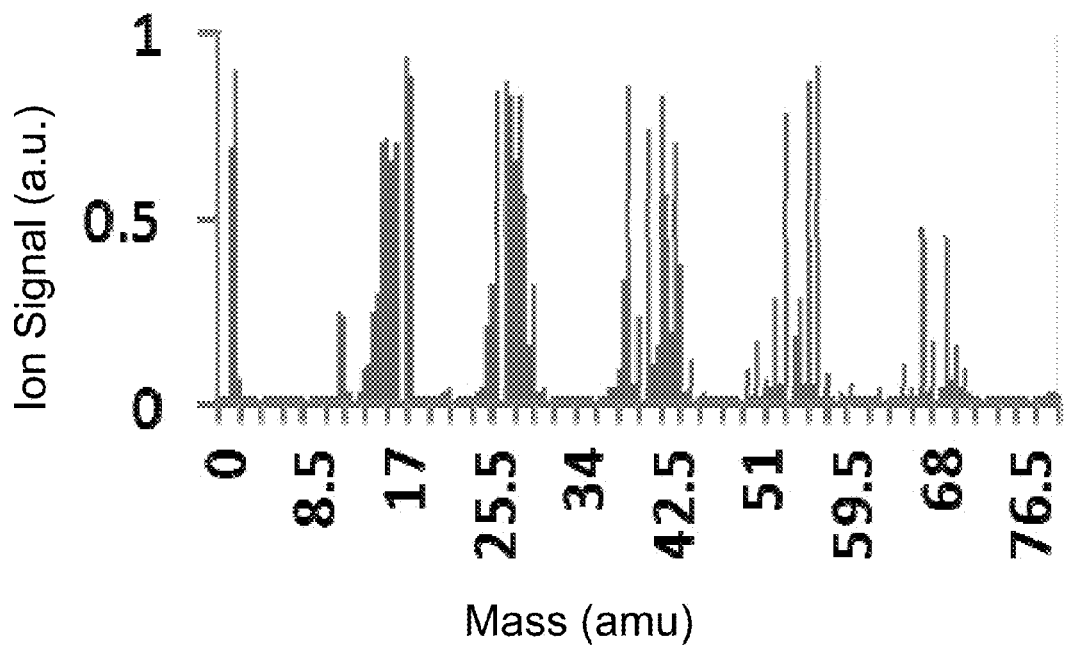
FIG. 11 is a mass spectrum of a sample held at 520 K after 15 min of cooking off excess oleic acid in accordance with an embodiment of the present invention.
Figure 12:
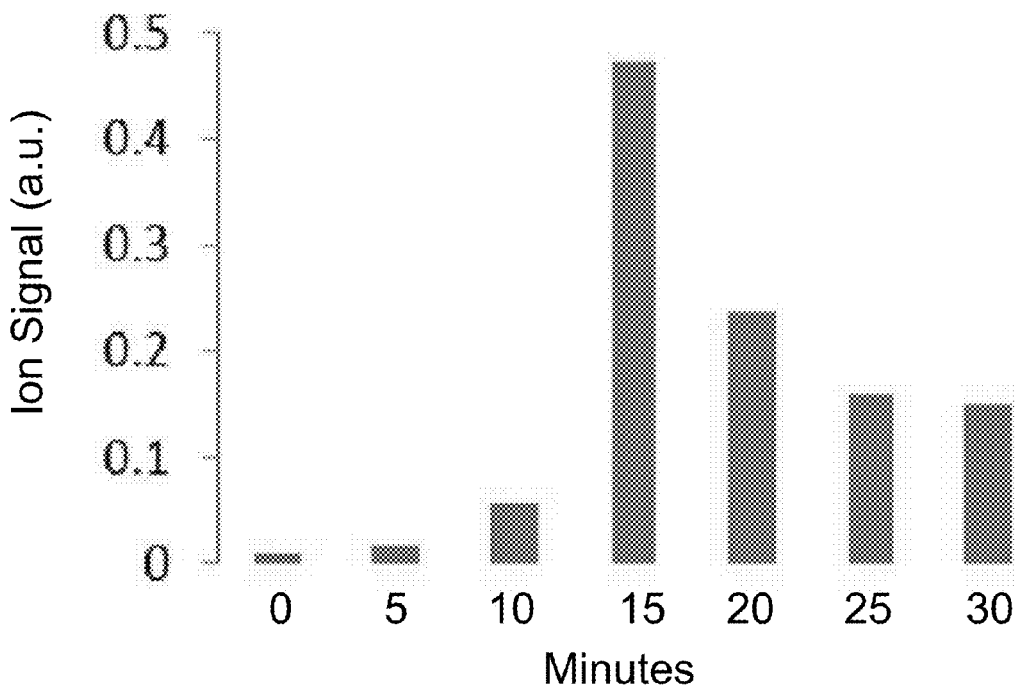
FIG. 12 is a graph of ion mass 67 (marker oleic acid desorption) from mass spectrometry scans taken every 5 min to monitor the ion mass 67 signal from oleic acid fragments in accordance with an embodiment of the present invention.
Figure 13:
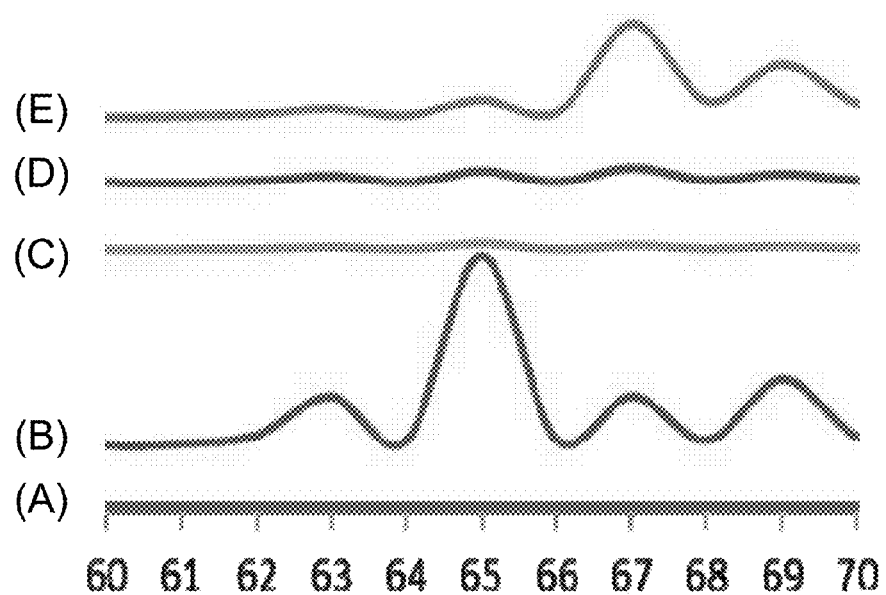
FIG. 13 shows mass spectra of fragments desorbed at different temperatures (a) 290° K (b) 430° K (c) 530° K (d) 630° K (e) 730° K in accordance with embodiments of the present invention.

FIG. 11 resembles a typical mass spectrum for oleic acid vaporized by electron impact source. Free oleic acid can be desorbed from the samples as a function time or a function of temperature. To minimize variables the samples were "cooked" as a function of time. The cooking temperature was chosen by first desorbing the sample as a function of temperature in 100 K increments and then analyzing where mass 67 desorbed. 530 K was chosen because it was the temperature that showed the least desorption before bound oleic acid began desorbing at 730 K.

Lastly we analyzed the oxidation state of aluminum in our sample. For this analysis we investigated the binding energy shift of the aluminum 2p peak. Under these conditions metallic aluminum will oxidized to a higher state. After removing the bound oleic acid and confirming an increase in oxidation state shift of 1.7 eV one can deduce that the original sample was unoxidized. The sample with the aluminum 2p peak centered at 74.1259 eV is a sample of oleic acid only capped aluminum nanoparticles, that have not been treated with benzylamine. Sample (A) and sample (B) were run on different days, and although they are at different binding energies they both represent the $Al^{3+}$ peak. The reason for this difference is that this instrument is not calibrated and the samples were run on different days. The important thing to note is that samples (B) and (C) are the same sample and run on the same day, therefore the relative shift would be consistent on any instrument run under the same conditions.

CONCLUSION

This research has resulted in a new technique for the synthesis of metal nanoparticles. Homogeneous media ball milling has opened doors to for the production of copious amounts of metal nanoparticles. These particles are also synthesized in a using a much faster procedure than conventional ball milling. Typical milling times for brittle materials range from several hours to several days. Homogeneous media ball milling begins producing measurable amounts of nanoparticles in a matter of minutes, and full production time is currently 3 hours. This process has the capability of being adapted to other soft metals, especially soft metals with catalytic capabilities, like gold, platinum, and palladium. This process may not be limited to soft metals. It is likely that this process could work just as efficiently for harder more brittle metals and even be extended to non-metallic materials such as zirconium oxide.

Homogeneous media ball milling is quite an adjustable process leaving many variables for tuning the size distribution of the nanoparticles synthesized. There are many factors that can be adjusted including, but not limited to milling time, milling speed, solvent, capping agent, and initial media size. Currently the process is tuned to generate the smallest possible aluminum particles at a high volume production rate. Currently the process is generated sub 20 nm aluminum particles, with the majority of the particles being less than 5 nm. These numbers were confirmed by both TEM and DLS measurements.

The binary capping agent process that involves first treating the nascent particles with benzylamine during the milling, and then capped by sonicating in the presence of oleic acid has resulting in nominally unoxidized aluminum nanoparticles. FTIR measurements confirm the presence of oleic acid bound to the surface of the nanoparticles. The asymmetric and symmetric bands of O—C—O located 1604 $cm^{-1}$ and 1465 $cm^{-1}$ are representative of strong chemisorbed interaction between oleic acid and the aluminum surface. Deductive analysis of the XPS spectra indicates that the sample which was air dried prior to analysis, was unoxidized after cooking off the free (loosely bound) oleic acid. Intentional oxidation resulted in a 1.7 eV shift which is representative of the separation between metallic aluminum ($Al^0$) and fully oxidized aluminum ($Al^{+3}$). This ability to generate very small soft metal nanoparticles has opened the doors for many opportunities in the future. Homogeneous media ball milling can be suitable for the production of large amounts of both soft and hard metal nanoparticles.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method of forming air-stable coated particles, comprising:
    crushing an oxidizable particulate, wherein the step of crushing is a wet milling process including a wetting agent in which a first organic ligand and/or a second organic ligand is substantially soluble;
    contacting the crushed oxidizable particulate with the first organic ligand to form an intermediate particulate; and
    contacting the intermediate particulate with the second organic ligand such that the intermediate particulate is comminuted sufficient to form a particulate oxidizable core which is substantially coated by a ligand coating formed of at least one of the second organic ligand and the first organic ligand to form the air-stable coated particles and wherein the ligand coating substantially preempts formation of an oxide layer of the oxidizable core on wherein the wetting agent is hexane or jet fuel, and wherein the oxidizable particulate consists essentially of boron, aluminum, magnesium, boron carbide, boron nitride or aluminum carbide.

2. The method of claim 1, wherein the second organic ligands displaces at least a portion of the first organic ligands.

3. The method of claim 1, wherein the second organic ligands substantially displaces the first organic ligands.

4. The method of claim 1, wherein the step of crushing is accomplished by ball milling, planar milling, roll milling, ultrasonic milling, or combinations thereof.

5. The method of claim 1, wherein the step of crushing is accomplished by homogenous ball milling.

6. The method of claim 1, wherein the step of crushing occurs in the presence of the first organic ligand.

7. The method of claim 1, wherein the step of crushing is sufficient to form coated particles having an average diameter from about 30 nm to about 100 nm.

8. The method of claim 1, wherein the oxidizable particulate has an average starting diameter from about 500 nm to about 1.5 μm.

9. The method of claim 1, wherein the first organic ligand is weakly binding.

10. The method of claim 1, wherein the second organic ligand is strongly binding.

11. The method of claim 1, wherein the first organic ligand and/or second organic ligand is non-polar.

12. The method of claim 1, wherein the first organic ligand and/or the second organic ligand is polar.

13. The method of claim 1, wherein the first organic ligand and/or second organic ligand is covalently attached to the oxidizable core.

14. The method of claim 1, further comprising purifying the particles after the step of crushing.

\* \* \* \* \*